Dec. 22, 1953     J. VERDERBER     2,663,339
FLUID OPERATED CLAMPING DEVICE
WITH LUBRICANT ATOMIZING MEANS
Filed May 17, 1950     3 Sheets-Sheet 2
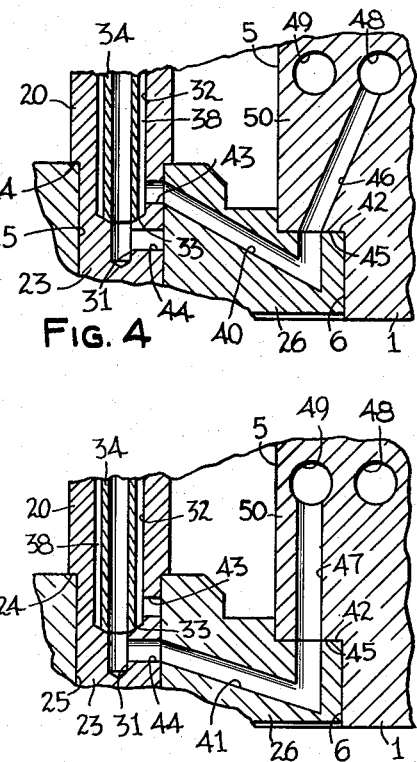
FIG. 4
FIG. 5
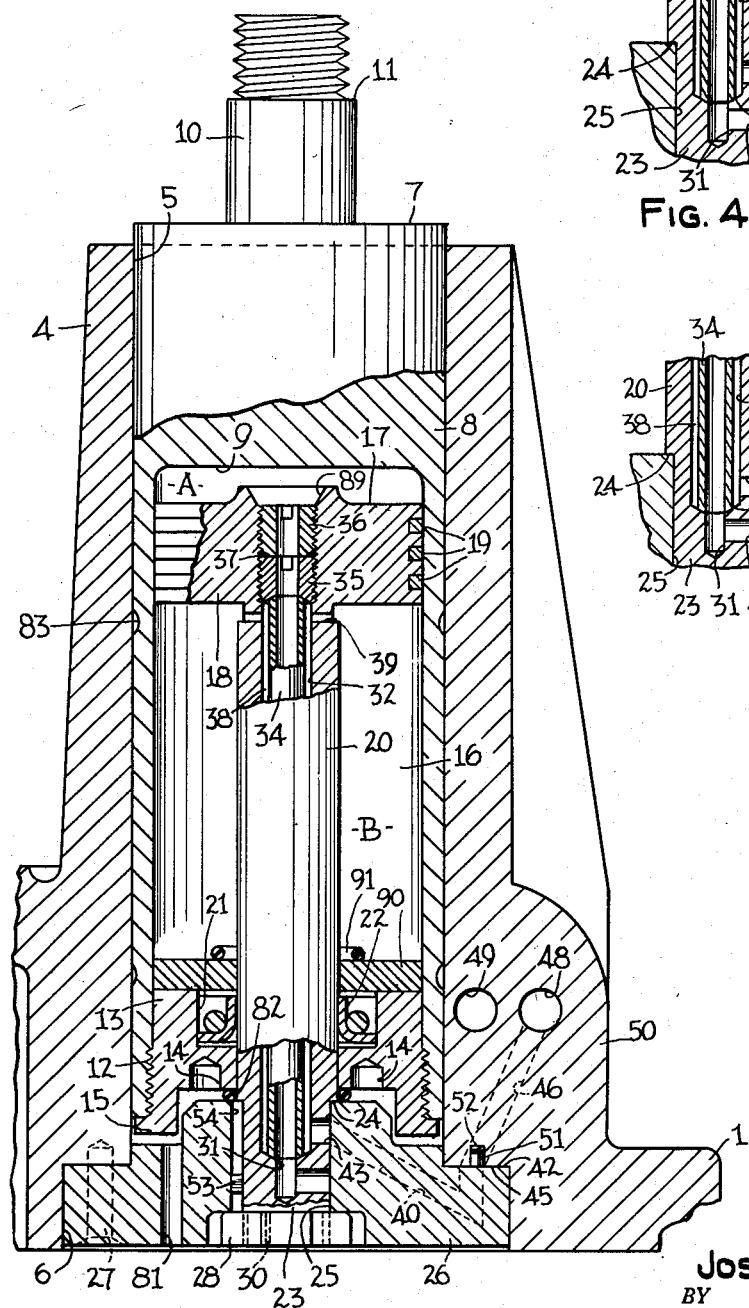
FIG. 3
INVENTOR.
JOSEPH VERDERBER
BY
ATTORNEY.

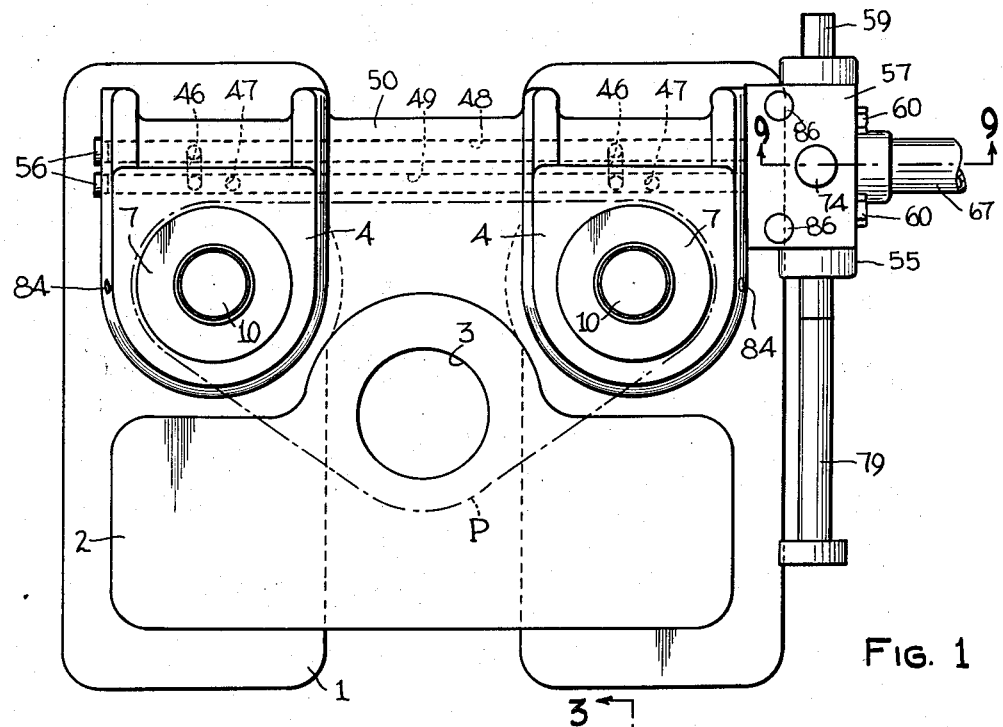
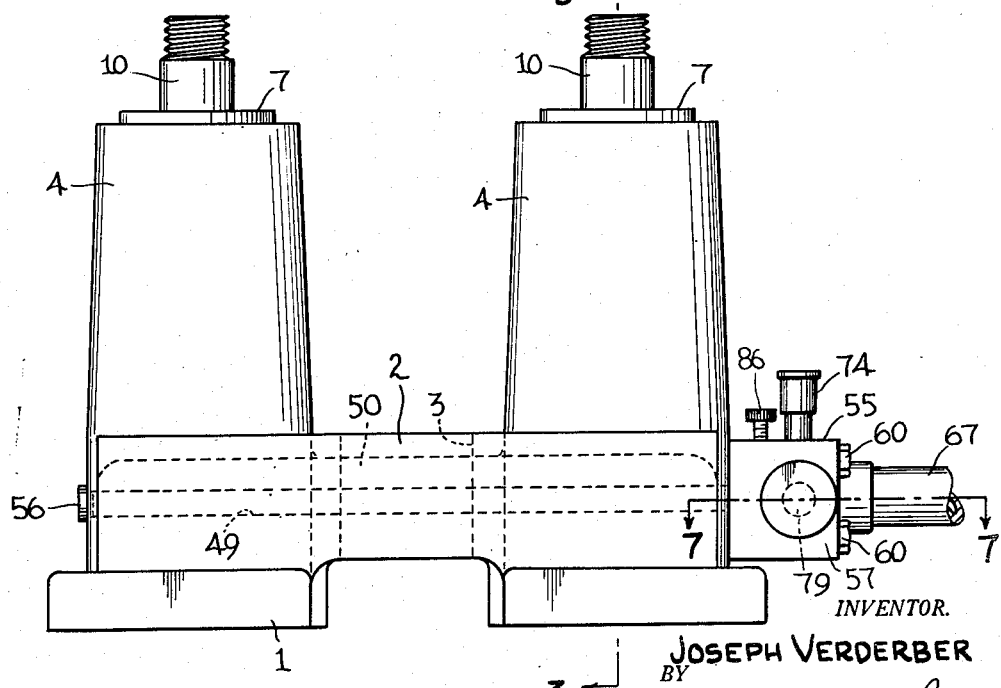

Dec. 22, 1953

J. VERDERBER 2,663,339

FLUID OPERATED CLAMPING DEVICE
WITH LUBRICANT ATOMIZING MEANS

Filed May 17, 1950

INVENTOR.
JOSEPH VERDERBER
BY
William Isler
ATTORNEY.

Patented Dec. 22, 1953

2,663,339

UNITED STATES PATENT OFFICE 2,663,339

FLUID OPERATED CLAMPING DEVICE WITH LUBRICANT ATOMIZING MEANS

Joseph Verderber, Cleveland, Ohio, assignor to The Cleveland Universal Jig Company, Cleveland, Ohio, a corporation of Ohio Application May 17, 1950, Serial No. 162,557

3 Claims. (Cl. 144—290)

1

The present invention relates to clamping devices and more particularly to a fluid operated clamping device such as a jig for holding workpieces during machining operations.

It is the primary object of my invention to provide a quick-acting clamping device which is actuated by fluid pressure such as compressed air.

Another object of my invention is to provide a clamping device which maintains its clamping action without requiring separate locking means to maintain it in its clamping position.

Still another object of my invention is to provide a clamping device which is semi-automatic in operation, requiring only a negligible effort on the part of the operator.

A further object of my invention is to provide novel and highly efficient cylinder lubricating means for such a clamping device.

Other objects and advantages of the invention will be apparent during the course of the following description.

In the accompanying drawings, forming a part of this specification, and in which like numerals are employed to designate like parts throughout the same, Fig. 1 is a top plan view of a drill jig embodying the features of my invention.

Fig. 2 is a front elevation of the same.

Fig. 3 is a vertical cross-sectional view of one of the standards taken on line 3—3 of Fig. 2.

Fig. 4 is a fragmentary cross-sectional view similar to Fig. 3 but showing one set of air-passageways, as indicated by line 4—4 of Fig. 6, certain parts being removed.

Fig. 5 is a fragmentary cross-sectional view similar to Fig. 4 but showing the other set of air passageways, as indicated by line 5—5 of Fig. 6.

Figure 7:
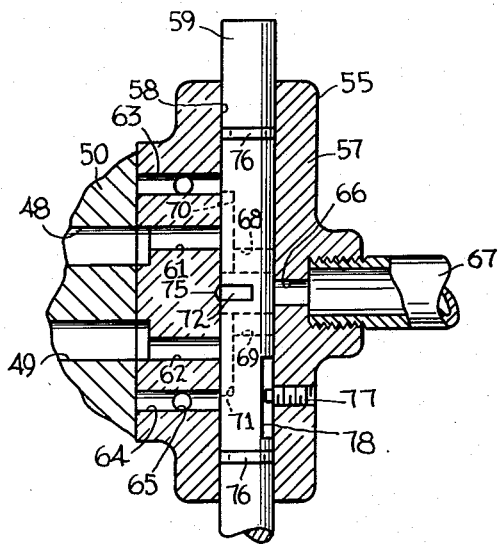
Fig. 7 is a longitudinal cross-sectional view of the valve structure taken on line 7—7 of Fig. 2, and showing the neutral position of the valve stem.

Referring more particularly to the drawings, the clamping device is seen to comprise a rigid cast-iron base 1 having a raised portion or pad 2 formed integrally therewith, which pad has a drill clearance hole 3 extending vertically therethrough.

Projecting vertically upwardly from the base 1 and integral therewith are a pair of cylindrical standards 4 having a longitudinal bore 5 extending completely therethrough. The bore 5 is counterbored as at 6 for a purpose which will presently be apparent.

Slidably mounted in the bore 5 of each standard 4 is a hollow cylindrical guide bar 7 having an upper closed end 8 which forms an interior face or surface 9. A threaded stud 10 projects upwardly from the end 8. The spaced studs 10 are adapted to support a clamping plate or top plate of suitable size and form. Such a top plate is indicated in Fig. 1 in broken-lines and is designated by the reference character P. The studs 10 have a circumferential shoulder 11 on which the top plate P can rest and against which the plate can be secured by suitable nuts, as is well known to those skilled in the art.

The lower open end of the guide bar 7 is threaded interiorly thereof as at 12 and has threadedly secured thereto a plug 13 having spaced spanner openings 14 provided therein for ease of assembly. The plug 13 has a radial flange 15 which underlies and abuts the lower end of the guide bar 7. The plug 13 and face 9 of the guide bar thus define a cavity or air chamber 16, as will appear more fully hereinafter.

Disposed within the cavity 16 is a stationary divider 17 which is substantially in the form of a piston head 18 having axially spaced piston rings 19 mounted thereon which have wiping engagement with the wall of the cavity. The head 18 has an integral rod or stem 20 which depends from the head and extends through the plug 13. The plug 13 has an annular recess 21 therein in which is secured an oil seal 22 which embraces the stem 20.

Figure 6:
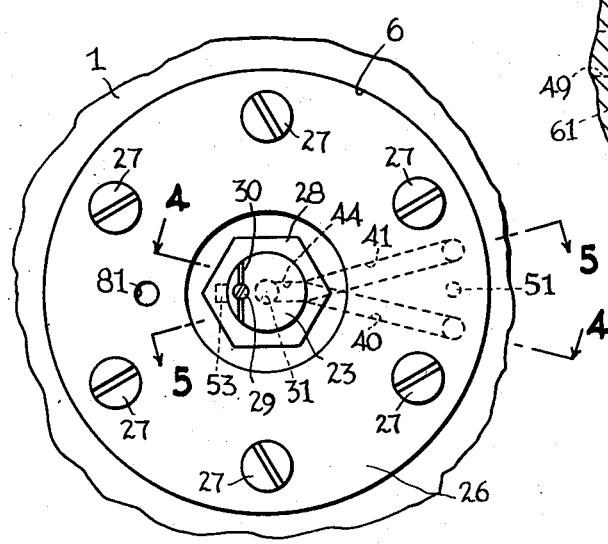
Fig. 6 is a fragmentary bottom plan view of the clamp device showing details of the cylinder closing plug.

The stem 20 terminates in an extension 23 of reduced diameter thereby forming a circumferential shoulder 24. The portion 23 of the stem extends through the bore 25 of a cap 26 which is mounted in the counterbore 6 and is secured to the base 1 by means of screws 27. A nut 28 is threadedly secured to the portion 23 of the stem and serves to maintain the shoulder 24 in abutment with the cap 26. As best seen in Fig. 6, in order to prevent any accidental loosening of the nut 28, the stem 20 is expanded against the nut by means of a tapered screw 29 which threadedly engages a split or slotted portion 30 of the stem.

The divider 17 has an axial closed-end bore 31 which terminates a short distance above the end of the extension 23. The bore 31 is counterbored as at 32, which counterbore extends through the head 18 and the stem 20 to a point a short distance above the end of bore 31, thereby forming a shoulder 33. A tube 34, having an internal diameter equal to that of bore 31 and having an external diameter less than that of bore 32, is axially disposed in the bore 32, it being secured against the shoulder 33 by means of two hollow set screws 35, 36 which are threadedly secured in the bore 32 and engage the upper end of the tube 34, the screw 36 serving as a locking screw. The screws 35, 36 serve as extensions of the bore 31. A ring gasket 37 is interposed between the screws 35 and 36 in order to prevent air leakage around the threads of the screws.

The bore of the tube 34 thus provides an extension of the bore 31 of the stem 20, which bore communicates with the upper portion A of the air chamber 16. The tube 34 also defines an annular passageway 38 in the stem 20, which passageway communicates with the lower portion B of the chamber 16, through a diametrical opening 39 which is provided in the stem 20.

The cap 26, which fits snugly on the extension 23 of the stem, has two channels 40 and 41 formed therein. The channel 40 extends downwardly from an annular face 42 of the cap 26 and then extends angularly upwardly to the bore 25 of the cap where it communicates with a radial opening 43 in the extension 23 which leads to the passageway 38 in bore 32. The channel 41 is spaced circumferentially from the channel 40 and runs from the face 42 downwardly, and then angularly upward to the bore 25 where it communicates with a radial opening 44 which leads to the bore 31.

The annular surface 45 formed in the base 1 at the juncture of bore 5 and counterbore 6 has openings 46 and 47 therein which correspond in position and spacing to the openings 40 and 41, respectively, in the surface 42. The opening 46 defines a passageway which extends angularly upward in the base 1 into communication with a transverse or horizontal channel 48 which extends completely through a web portion 50 which connects the standards 4. The opening 47 likewise defines a passageway which extends upwardly into a second transverse channel 49 which lies parallel to and forwardly of the channel 48.

In order that there be proper registry between the various passageways heretofore described, the cap 26 is provided with a locating dowel 51 which is received in a cavity 52 so as to assure alignment of channels 40 and 41 in cap 26 with channels 46, 47 respectively in the base 1. Angular alignment of channels 40 and 41 with the radial openings 43 and 44 respectively is effected by means of a fixed radial key 53 on the extension 23, which engages a keyway 54 in the cap.

The operation of the clamping device is controlled by a valve 55 which communicates with the channels 48 and 49. The channels 48 and 49 are open at either end so that the valve may, as desired, be mounted on either side of the device. In the drawings, the valve is shown mounted on the right side of the device, and when thus mounted, plugs 56 are inserted in the opposite open ends of channels 48 and 49 so as to close them. If the valve were mounted on the left side, the plugs 56 would be inserted on the other ends of the channels.

The valve 55 comprises a valve body 57 having a central longitudinal bore 58 therethrough in which is slidably received a valve stem 59. The valve is secured to the side of one of the standards 4 by means of bolts 60 which extend through the body 57 into the web section 50. The valve body has two horizontally spaced passageways 61 and 62, one of which leads from channel 48 to the bore 58, and the other of which leads from channel 49 to the bore 58.

In the same plane as channels 61, 62 and parallel thereto, but spaced outwardly therefrom, are two additional channels 63, 64 which lead from the bore 58 to a vertical bore 65 which in turn communicates with a transverse exhaust channel 85 which is open to the atmosphere. Each vertical bore 65 is tapped to receive a thumb screw 86 which can be threadedly adjusted to fully or partially intercept or block the channels 63 and 64 for a purpose which will be described hereinafter. In order to retain the thumb screw 86 firmly in any selected position and to prevent it from being jarred or loosened by vibrations, it is releasably secured by a set screw 87 which is disposed in a tapped opening 88 in the body 57 of the valve.

An inlet channel 66 in the body 57 leads from the bore 58 to an air hose 67 which is threadedly secured to the valve body.

Two axially spaced diametrical openings 68, 69 are provided in the valve stem 59, which openings are adapted to communicate alternately with the air inlet 66. Each of the openings 68, 69 terminates in an elongated groove or cavity 70, 71 respectively, adjacent the openings 61, 62, the groove 70 being of such dimension as to traverse the openings 61 and 63, and the groove 71 on channel 69 traversing openings 62 and 64.

At a point on the valve stem which lies intermediate the location of the openings 68, 69, a narrow inclined groove or slot 72 is provided. The upper end of the slot communicates with the inlet channel 73 of a gravity oiler 74 which is threadedly secured to the valve body 57. The lower end of the groove 72 is directed toward a shallow depression or pocket 75 which is formed in the wall of bore 58.

The valve stem 59 fits snugly in the bore 58 and has O-rings 76 mounted thereon to prevent leakage of air around the stem. Reciprocal sliding movement of the valve stem is limited by a dog-point set screw 77 which is threadedly secured in the body 50 so as to project into a groove 78 of predetermined length which is provided on the surface of stem 59.

Each end of the valve stem has a tapped opening 80 in which may be threadedly secured an extension rod 79 to facilitate manipulation of the valve stem. The extension rod 79 would be secured to one or the other end of the valve stem, dependent upon whether the valve were mounted on the left side or the right side of the clamping device.

The operation of the device will now be described.

Figure 8:
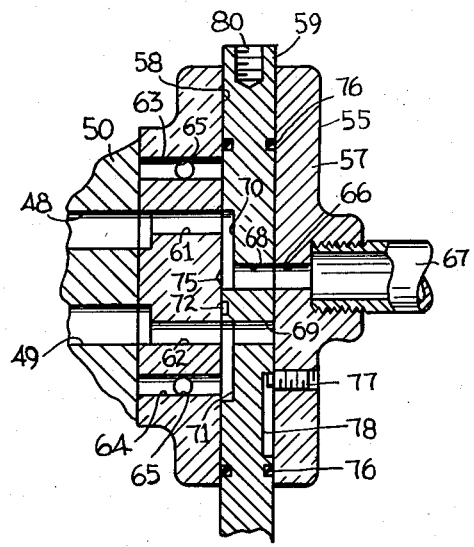
Fig. 8 is a cross-sectional view similar to Fig. 7 but showing the position of the valve stem when clamping action is desired.
Figure 9:
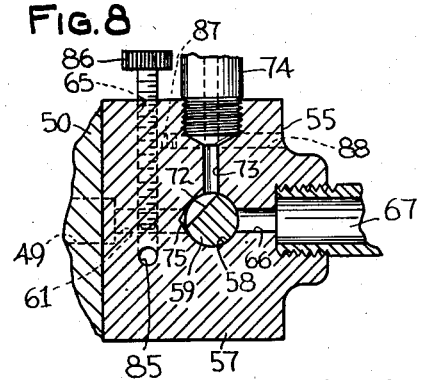
Fig. 9 is a transverse cross-sectional view of the valve structure taken on line 9—9 of Fig. 1.

A fluid under pressure, such as compressed air, is piped to the valve 55 by means of the air hose 67. Assuming now that the valve stem 59 is in the neutral position shown in Fig. 7, the air cannot pass the valve stem and the clamping device will not be actuated. If it is desired to clamp a workpiece between the top plate P and the pad 2, the valve stem is moved to the position shown in Fig. 8. The air now passes through channel 68 in the valve stem and is directed into channel 61 by the groove 70, from whence it enters the passageway 48. The air then passes through channel 46 in the base 1 and into channel 40 in the cap 26. It then flows through opening 43 in stem extension 23 and into the annular passageway 38 in the stem 20. The compressed air escapes from stem 20 through the opening 39 and into the lower portion B of the cavity 16. The air acts upon the plug 13 to cause the guide bar 7 to move downwardly in the standard 4. An air vent 81 is provided in the cap 26 to prevent any air entrapment during the downward movement of the guide bar. In order to prevent the jarring of the plug 13 against the cap 26 as the guide bar reaches the bottom of its stroke, a resilient cushion in the form of an O-ring 82 is provided on the cap 26.

As the guide bar is forced downwardly by the compressed air in chamber B of the cavity 16, the entrapped air in the chamber A is forced into the tube 34 and the bore 31 and leaves the stem 20 through the radial opening 44. It passes through channel 41 into passageway 49 and thence through channel 62 in valve body 57 where it is directed by cavity 71 into channel 64 and exhausts to the atmosphere through exhaust opening 65.

It will be apparent that the speed or rapidity with which the clamping action will take place can be controlled by controlling the escape of air from chamber A. This is accomplished by the thumb screw 86 which intercepts the channel 64. If the screw 86 blocks channel 64 almost completely, the air in chamber A will be able to exhaust only very slowly and the downward movement of the guide bar will thereby be retarded. On the other hand, if the channel 64 is only partially blocked by the screw 86, or is not blocked at all, the air will escape freely and rapidly through exhaust opening 65 and the downward movement of guide bar 7 will be relatively rapid.

When it is desired to release the workpiece, the valve stem is moved to a position where the channel 69 is aligned with the air inlet 66. A reversal of the above described action then takes place, the compressed air being directed into channel 62 and passageway 49 and passing into bore 31 through channels 47 and 41 and the radial opening 44. The air passes through tube 34 and escapes into the upper chamber A of cavity 16 where it exerts pressure upon the surface 9 to cause the guide bar 7 to move upwardly. The air in chamber B is thereby forced into the opening 39 and through the annular passageway 38 and opening 43 into the channels 40 and 46 and thus to passageway 48. From passageway 48 it exhausts to atmosphere through channel 61, cavity 70, channels 63 and 65, and exhaust passageway 85.

It will be understood that the rate of upward movement of the guide bar 7 can be controlled by the thumb screw 86 which intercepts channel 63 in the same manner as heretofore described with reference to control of the speed of clamping action. Thereby both phases of the operative cycle of the clamping device can be controlled independently of each other. One can adjust the thumb screws 86 so as to obtain the combination of quick clamping-slow release, slow clamping-quick release, slow clamping-slow release, and quick clamping-quick release.

Thus the structure is so designed that the air can be directed to one side or the other of the divider 17 to cause either upward or downward movement of the guide bars. Lubrication of the exterior of the guide bars is accomplished by means of circumferential oil grooves 83 on the guide bars to which oil can be fed through suitable openings 84 in the standards 4.

Lubrication must also be provided for the wall of the cavity 16 in order to assure smooth operation of the guide bar. Inasmuch as the cavity is completely closed, I have devised a novel means for lubricating it effectively. It will be noted that the inclined groove 72 on the valve stem 59 is so disposed that it will collect oil which drips from the oiler 74 into the bore 58 through the channel 72. As the valve stem is moved from one extreme of position to the other, during the operation of the clamping device, a droplet of oil from the groove 72 collects in the pocket 75. The sudden impingement of the compressed air entering through either channel 61 or channel 62 as the valve stem is manipulated causes the oil in the pocket to be atomized and carried with the air stream into the cavity 16. Thus, each time the valve stem is moved from one operative position to the other, a small quantity of lubricant is injected into one or the other of the chambers A and B of the cavity, thus keeping it constantly well lubricated.

The excess droplets of lubricant which are carried into the chamber A will collect in a receptacle 89 formed in the top of the piston head 18 and thus will create a small reservoir of oil which will be either blown into the chamber A or sucked into the chamber B on each upward or downward movement of the guide bar 7. The reservoir of oil is sufficient to lubricate the cavity for a considerable length of time in the event that the supply from the oiler 74 should become blocked or exhausted.

The length of the stroke of the guide bar 7 can be controlled by a washer or spacer 90 which is loosely carried on the stem 20 so as to rest on the plug 13. The thickness of the spacer 90 serves to limit the maximum upward movement of the guide bar relatively to the divider 17. A resilient O-ring 91 is loosely carried on stem 20 and rests on top of the spacer 90 so as to serve as a cushion against abutment of the spacer 90 against the underside of the head 18 when the guide bar 7 reaches the top of its stroke. The internal diameter of the O-ring 91 is considerably greater than the diameter of the stem 20 so as to prevent any possibility of the O-ring sealing or blocking the opening 39 in the stem.

The length of the stroke can be changed by using a spacer which is either thicker or thinner than the spacer 90. A thinner spacer will have the effect of increasing the length of stroke, whereas a thicker spacer will serve to shorten the stroke of the guide bar 7. The structure of the device is such that the spacer can readily be changed with a minimum of effort. It is merely necessary to remove the nut 28, the cap 26 and the plug 13 to replace the spacer 90. Thus neither the guide bar nor the divider 17 need be removed.

It will thus be apparent that I have provided a highly efficient semi-automatic clamping device including novel means for controlling said device and including means for lubricating said device.

It is to be understood that the form of my invention, herewith shown and described, is to be taken as a preferred example of the same, and that various changes in the shape, size and arrangement of parts may be resorted to, without departing from the spirit of my invention or the scope of the subjoined claims.

Having thus described my invention, I claim:

1. A fluid operated clamping device comprising an article-supporting base, a hollow standard formed integrally with said base and projecting therefrom, a cylinder slidably mounted in said standard for reciprocable movement therein, an article-clamping member secured to said cylinder for movement therewith, a cap secured to said base in sealing engagement with one end of said standard, a piston fixedly secured to said cap and projecting upwardly into said cylinder to define two chambers therein, said piston being provided with a port communicating with one of said chambers and a second port communicating with the other of said chambers, separate fluid passageways in said cap communicating with said ports, separate fluid passageways in said base communicating with said passageways in said cap, and valve means secured to said base exteriorly thereof for selectively directing fluid under pressure into one or the other of said passageways in said base, whereby said clamping member is caused to move relatively to said base.

2. A fluid operated clamping device as defined in claim 1, wherein said valve means comprises a valve body having a pair of spaced fluid channels therein, a valve stem slidably mounted in said body and having spaced openings adapted to register with said channels, a fluid inlet in said body in communication with said valve stem, a pocket formed in said body in direct alignment with said fluid inlet, a lubricant channel in said body communicating with said valve stem, and means on said valve stem for directing lubricant from said lubricant channel to said pocket whereby all fluid entering said inlet impinges upon said lubricant-containing pocket.

3. A fluid operated clamping device as defined in claim 1, including adjustable exhaust control means operatively associated with each of said cylinder chambers to independently limit the rate of exhaust flow from one of said chambers in response to fluid pressure applied to the other of said chambers.

JOSEPH VERDERBER.

References Cited in the file of this patent

UNITED STATES PATENTS

| Number | Name | Date |
| --- | --- | --- |
| 898,413 | Merralls | Sept. 8, 1908 |
| 1,219,334 | Lower | Mar. 13, 1917 |
| 1,388,459 | Greene et al. | Aug. 23, 1921 |
| 1,531,375 | Bridgham | Mar. 31, 1925 |
| 1,711,079 | Bath | Apr. 30, 1929 |
| 1,903,775 | Christopher | Apr. 18, 1933 |
| 1,961,044 | Hawes et al. | May 29, 1934 |
| 1,968,700 | Milotta | July 31, 1934 |
| 2,081,248 | Murphy | May 25, 1937 |
| 2,204,649 | Barnhart | June 18, 1940 |
| 2,395,671 | Kleinhaus et al. | Feb. 26, 1946 |
| 2,402,848 | Senn | June 25, 1946 |
| 2,477,490 | Martin | July 26, 1949 |
| 2,519,311 | Ferguson | Aug. 15, 1950 |

FOREIGN PATENTS

| Number | Country | Date |
| --- | --- | --- |
| 2,877 | Great Britain | Feb. 8, 1909 |